3,677,781
METHOD OF MAKING CEMENT CLINKERS
Hubert O. Nickelsen, Saratoga, Calif., and Joseph E. Kopanda, Crown Point, and Felix J. Piasecki, Whiting, Ind., assignors to United States Steel Corporation
Continuation-in-part of application Ser. No. 677,991, Oct. 25, 1967. This application July 24, 1970, Ser. No. 58,188
Int. Cl. C04b 7/48
U.S. Cl. 106—100
10 Claims

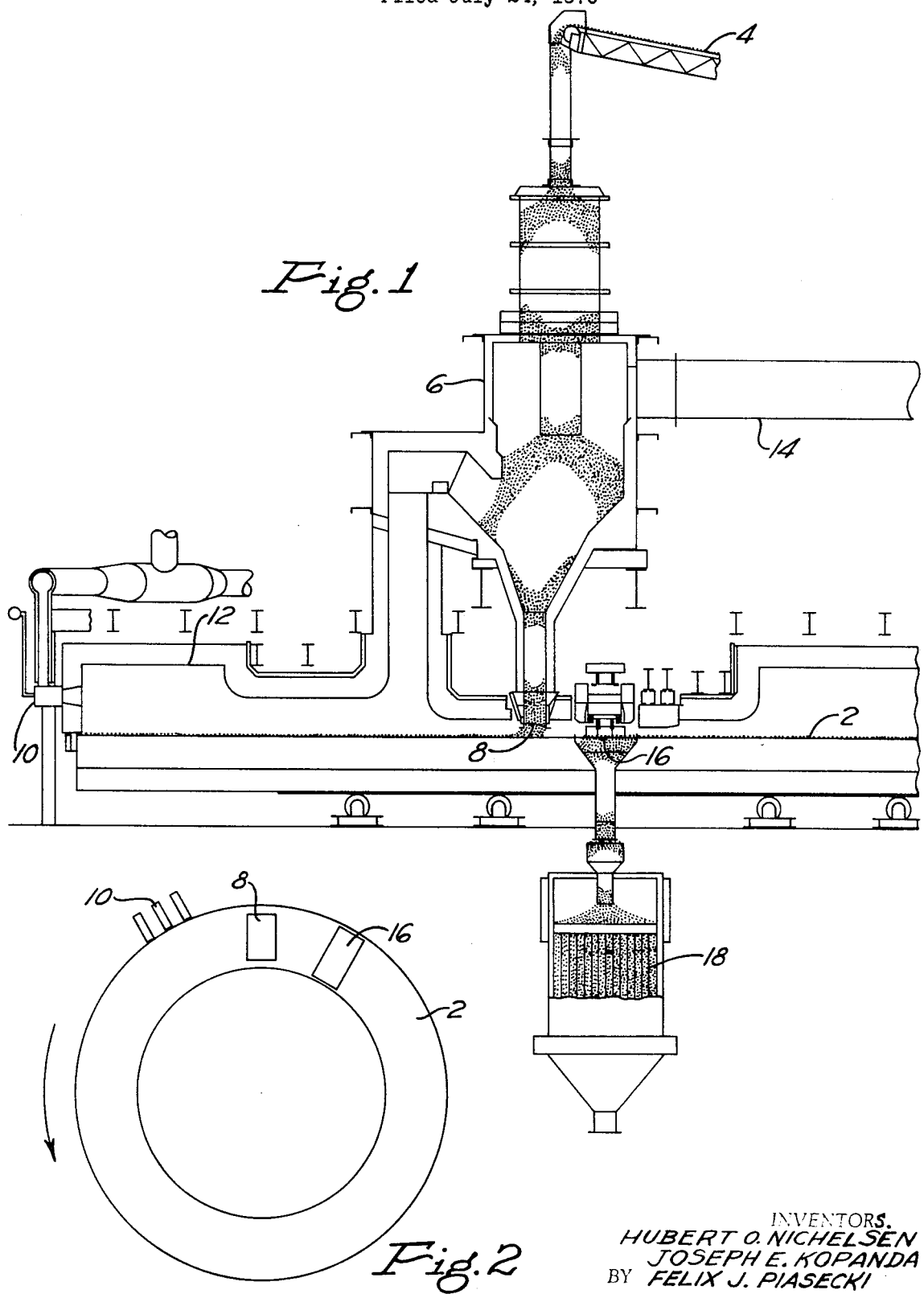

ABSTRACT OF THE DISCLOSURE

The method of making cement clinkers which includes preheating a calcium aluminate or calcium silicate raw mix in granular form to remove surface water and water of crystallization therefrom, and then rapidly heating the preheated raw mix to a temperature below the melting point of the raw mix but not more than 500° F. below the melting point of calcium silicate raw mixes nor more than 250° F. below the melting point of calcium aluminate raw mixes. $CaSO_4$ is added to ferruginous calcium aluminate raw mixes to broaden the sintering range. Also, improved cements made according to this method.

---

This application, which is a continuation-in-part of our co-pending application Ser. No. 677,991 filed Oct. 25, 1967, now abandoned, relates to cement clinkers and to a method of making the same and more particularly to the making of clinkers for use in making calcium aluminate and calcium silicate cements such as portland cements. The most common way of making all types of cement clinker is in a cement kiln wherein the raw materials are fed into one end of the kiln and gradually heated to a temperature wherein at least incipient fusion takes place to form typical minerals. In the case of calcium aluminate cements, the mixture is normally melted at temperatures of 2500° F. or higher. In the case of portland or calcium silicate cement, there is only incipient fusion. The calcium aluminate raw mix at the firing end of the kiln forms a molten bath which is tapped periodically and then quenched, whereas portland cement clinkers are discharged continuously from the firing end of the kiln in solid form. The clinkers in all cases are cooled and ground to the desired finenesses and additives, if any, are added thereto. The present invention does not contemplate any changes in the procedure following the production of the clinker.

Calcium aluminate cement can also be made by sintering or fritting at lower temperatures for varying periods of time, for example, 10 hours at 1832° F. or 7 hours at 1922° F., but such processes have never been commercially practical for various reasons. Attention is directed to the book "High-Alumina Cements and Concretes" by T. D. Robson, published by John Wiley & Sons, Inc., in 1962 for a further teaching of the prior art. In the manufacture of cement clinkers in kilns as presently practiced, there is formed on the walls of the kiln intermediate its length a ring of partially fused raw feed which inhibits the continuous flow of the raw feed to the hot zone. Thus, it is necessary to shut down the kiln and remove this ring, which is an expensive and time consuming operation. The kilns are also expensive to manufacture since they must have considerable length, such as 200 ft. or more, in order to provide the necessary residence time of the raw mix in drying, calcining, intermediate and hot zones.

Klein Pat. No. 3,257,219 dated June 21, 1966, discloses a method of making high alumina or calcium aluminate cement by sintering a raw mix at temperatures below the melting point of the raw mix. It appears that this method was actually carried out in a pilot plant size rotary kiln and does not form a ring of partially sintered raw feed on the kiln lining. However, high purity raw mixes were used in which the iron content and the silica content are low. This, of course, is not practical for large scale production. It also appears that the raw feed is fed through the kiln in the usual manner with the temperature of the raw mix being raised gradually to the ultimate desired temperature. Thus, there is no substantial reduction in the total residence time in the kiln as compared to the prevailing practices, although the time that the temperature is above 1900° F. is reduced from that of prevailing practices.

We have found that, contrary to previous thinking, the intermediate heating step can be omitted and the raw mix after being heated to remove surface water and water of crystallization can be rapidly heated (maximum of 8 minutes) to a temperature below the melting point of the mixture and that this practice, which may be called "shock sintering" results in a sinter having a quality as good as or better than that of the usual clinker. The resident time within the kiln is also reduced, the time of exposure to material temperatures above 1600° F. is reduced to as low as two minutes, and the maximum temperature required is reduced to below that possible with the Klein process.

It is therefore an object of our invention to provide a method of making cement clinker which is cheaper than the prevailing methods and also reduces dust loss.

Another object is to provide such a method which can be performed in various types of equipment, which equipment is less expensive than the type required for practicing present methods.

A further object is to provide such a method which, when practiced in a rotary kiln, eliminates the ring formation produced by the present commercial methods.

Another object is to provide a method of broadening the sintering range of ferruginous calcium aluminate raw materials.

A still further object is to provide a relatively cheap sintered cement clinker.

Still another object is to provide a cement of improved refractoriness.

These and other objects will be more apparent after referring to the following specification and attached drawings, in which:

FIG. 1 is an elevation of one form of apparatus which may be used in the practice of our invention; and FIG. 2 is a schematic plan view on a reduced scale showing the hearth of FIG. 1.

According to our invention, we first select a raw mix of the composition necessary to provide a clinker suitable for grinding into a cement of the desired composition. This mixture, as charged, must be in granular form, either a powder or agglomerates. For various reasons, it is much preferred that the mixture be formed into pellets of suitable uniform size, such as approximately ¼ to ¾". This may be done by any standard method. For example, a moist pellet can be prepared by centrifuging or extruding to obtain the desired shape. After the raw mix is prepared, it is heated to a temperature sufficient to remove surface water and water of crystallization therefrom. It is preferred that this temperature be below that at which complete decarbonation takes place and it must not exceed the temperature which is 300° F. below the maximum sintering temperature of the specific raw mix. The raw mix is then fed directly into a heating chamber or hot zone, without substantial intermediate heating, where it is rapidly heated to a temperature below the melting point of the raw mix. It is preferred that the raw feed be fed to the hot zone without any substantial cooling, but the method will work as long as the feed is free of water. The temperature to which the calcium silicate raw mixes are heated must not be more than 500° F. below the melting point of the raw mix and the temperature to which the calcium aluminate raw mixes are heated must not be more than 250° F. below the melting point of the raw mix. It is preferred that the temperature be at least 50° below the melting point. It is necessary that the raw mix be in granular form and that it be fed to the hot zone at such a rate and in such a manner that there will be complete exposure of substantially all the pellets to the heat in order that the raw mix be raised to the desired temperature within 8 minutes. Actually the raw mix has been heated to this temperature in under one minute. The rise in temperature must be a minimum of 300° F. The mix must also be maintained at this temperature for at least two minutes and preferaably under ten minutes.

The sintering chamber may be horizontal, inclined or vertical. It may be a rotary kiln, shaft-type kiln, traveling hearth or grate, or an agitated fluid bed. It may be standard equipment or standard equipment modified to better practice the method.

One type of equipment in which the method has been practiced and which is shown schematically in the drawings is manufactured by Calcimatic, Ltd., of Toronto, Ontario. As shown, a doughnut-shaped hearth 2 is provided which rotates in a counter-clockwise direction. The raw mix is fed to the hearth 2 from a conveyor 4 through a preheater 6 and discharge gate 8. Burners 10 are located a short distance from the gate in a counter-clockwise direction and discharge into a hood 12 which surrounds the hearth 2. The exhaust gases pass from the hood 12 around the preheater 6 and exhaust through conduit 14. A takeoff 16 is provided a short distance clockwise from the gate 8 and the clinker is discharged therethrough to a cooler 18. The raw feed is heated in the preheater 6 and in the short distance on the hearth 2 between the gate 8 and burners 10 to a temperature below that at which complete decarbonation takes place. This temperature is approximately 1600° F.

The pellets form a single layer on the hearth 2 so that, when they reach the position in front of the burners 10, they will be heated very rapidly to a sintering temperature below the melting point of the raw mix.

Both calcium aluminate cements and portland cements may be made according to our method.

Calcium aluminate cement clinkers are preferably made from the following raw mixes in which the indicated numbers are percent by weight, the $Al_2O_3$ percentage including any $TiO_2$ which may be present:

|  | Broad range | Type A | Type B |
|---|---|---|---|
| $SiO_2$ | 0–5.0 | 2.5–5.0 | 2.5–5.0 |
| $Al_2O_3$ | 28.0–56.0 | 32.0–37.0 | 35.0–41.0 |
| $Fe_2O_3$ | 0–7.0 | 5.0–7.0 | 0.4–1.4 |
| CaO | 14.0–42.0 | 23.0–28.0 | 21.0–26.0 |
| MgO | 0–3.0 | 0–1.5 | 0–1.5 |
| MnO | 0–1.0 | 0–0.6 | 0–0.6 |
| $SO_3$ as $CaSO_4$ | 0–4.0 | 0.5–2.6 | 0–1.6 |
| Alkalies | Trace | Trace | Trace |
| Loss on ignition | 26.0–33.0 | 27.0–31.0 | 26.0–33.0 |

Specific raw mixes which may be used for making clinker for Type A and Type B cements are:

|  | Type A | Type B |
|---|---|---|
| $SiO_2$ | 3.3 | 3.3 |
| $Al_2O_3$ | 35.2 | 38.5 |
| $Fe_2O_3$ | 6.2 | .8 |
| CaO | 23.9 | 23.5 |
| MgO | 0.1 | .8 |
| MnO | .3 | .3 |
| $SO_3$ as $CaSO_4$ | 1.6 | 1.6 |
| Alkalies | Trace | Trace |
| Loss on ignition | 29.4 | 31.2 |

For Type B cement it is also possible to use essentially the same mixture with the $SO_3$ omitted.

Calcium silicate cement clinkers are preferably made from the following raw mixes:

|  | | Portland raw mix | |
|---|---|---|---|
|  | Broad range | Range | Specific |
| $SiO_2$ | 15.0–19.0 | 16.0–16.8 | 15.4 |
| $Al_2O_3$ | 1.5–.60 | 3.8–4.4 | 4.3 |
| $Fe_2O_3$ | Trace–4.0 | 1.4–1.8 | 1.5 |
| CaO | 44.0–51.0 | 48.5–50.0 | 49.5 |
| MgO | 1.0–3.0 | 2.0–2.6 | 2.2 |
| MnO | 0.1–0.8 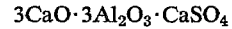 | 0.2–0.4 | 0.2 |
| $SO_3$ as $CaSO_4$ | Trace–3.0 | Trace–3.0 | 1.6 |
| Alkalies | 0.2–0.8 | 0.2–1.0 | .5 |
| Loss on ignition | 22–28 | 23–27 | 24.8 |

In any of the cement mixes mentioned above, the initial heatings are preferably carried out for a period of 30 minutes to raise the maximum temperature to approximately 1600° F. However, this temperature may be as low as 300° F. In the case of calcium aluminate clinkers, the shock sintering is at a temperature of approximately between 50 and 250° F. below the melting point of the raw mix. For Type A cement clinkers the material sintering temperature is preferably about 2450° F., for Type B clinkers the preferred temperature is approximately 2500° F. For calcium silicate cement clinkers, the sintering is at a material temperature of approximately between 150 and 500° F. below the melting point of the raw mix. In making most portland cement clinkers, the preferred temperature will vary between 2600 and 2900° F. depending upon the composition of the mix.

The calcium aluminate clinkers, when made under oxidizing or neutral conditions, include the compound $$3CaO \cdot 3Al_2O_3 \cdot CaSO_4$$

which is designated as $C_4A_3\bar{S}$ and has suitable hydraulic properties. The percentage of this compound will vary, depending on the amount of $SO_3$ added as $CaSO_4$ in the raw mix. The calculated $C_4A_3\bar{S}$ content of the clinker for the broad range is between 0 and 30.5%; for Type A between 3.8 and 19.8%; and for the specific examples of Types A and B, 12.2%.

It will be seen that the raw feed of each group of raw materials may include $SO_3$ in the form of $CaSO_4$. In the Type A and other ferruginous raw mix, this addition is essential to widen the sintering range to a practical range. For this purpose the addition under certain conditions may be as high as 4%. However, there are disadvantages in more than 3% addition so that we prefer to maintain the maximum at 2.6%. The optimum addition is 1.3%. While the sintering range for the Type B composition is sufficient in commercial practice the range can be further widened by addition of calcium sulfate. When used in calcium silicate cement raw feeds calcium sulfate appears to function as a catalyst by accelerating the combination of desirable calcium silicate constituents at lower temperatures in the shock sintering process.

Our invention eliminates the intermediate heating zone which reduces the cost of the equipment and fuel requirements and the shock sintering causes rapid (almost instant) atomic interaction of the raw mix constituents with the water removed to produce desirable cementitious compounds immediately instead of gradually by the slower conversions of the raw mix constituents by prior practices. In general, Type A clinkers made according to our invention generally have more $C_3A$ and $CA_2$ than similar clinkers made from the same raw mix by conventional methods. It is believed that shock sintering is carried out almost entirely as solid-solid reactions occurring simultaneously with complete calcination.

It is also believed that, instead of producing compounds having idiomorphic crystal structures, small deformed crystal lattices are produced which are more active hydraulically and thus results in better cements. Concrete mixes made from shock sintered Type A cement are stronger than those made from conventionally produced cements, have better resistance to load deformation at 2400° F., improved refractoriness as indicated by a higher pyrometric cone equivalent (PCE) as neat cements and mixes, and better resistance to CO disintegration. Similarly, concrete mixes made from shock sintered Type B cement, whether it is made from Type B clinker manufactured with or without calcium sulfate additions, also exhibit better performance than those mixes containing comparable cements produced by conventional methods.

While several embodiments of our invention have been shown and described, it will be apparent that other adaptations and modifications may be made without departing from the scope of the following claims.

We claim:

1. The method of making sintered clinker for grinding into a cement of the class consisting of calcium aluminate and calcium silicate cements, which comprises providing a granular raw mix of the class consisting of calcium aluminate and calcium silicate raw mixes, preheating said raw mix to a temperature sufficient to remove surface water and water of crystallization therefrom but to a maximum temperature which is 300° F. below the maximum sintering temperature of said raw mix, feeding said preheated raw mix with the surface water and water of crystallization removed into a heating chamber at a rate and manner to expose substantially all of said granules to the heat therein and raise their temperature at least 300° F. within eight minutes to a temperature below the melting point of said raw mix but not more than 500° F. below the melting point of calcium silicate raw mixes and not more than 250° F. below the melting point of calcium aluminate raw mixes, and maintaining said raw mix at its last named temperature for a period of at least two minutes.

2. The method of claim 1 in which the raw mix is pelletized prior to preheating the same.

3. The method of claim 1 in which said raw mix includes $SO_3$ in the form of calcium sulfate.

4. The method of claim 3 in which the calcium aluminate raw mix includes in percent by weight: 0 to 5.0% $SiO_2$; 28.0 to 56.0% $Al_2O_3$; 0 to 7.0% $Fe_2O_3$; 14.0 to 42.0% CaO; 0 to 3.0% MgO; 0 to 1.0% MnO; 0 to 4.0% $SO_3$ as $CaSO_4$; trace—alkalies; and 26.0 to 33.0% loss on ignition, and in which the sintering temperature is between 50 and 250° F. below the melting point of the raw mix.

5. The method of claim 4 in which the preheating is accomplished solely by exhaust gases from said chamber.

6. The method of claim 5 in which the period of heating in said chamber is a maximum of ten minutes.

7. The method of claim 6 in which the raw mix is pelletized prior to preheating the same.

8. The method of claim 3 in which the raw mix contains ingredients for making calcium silicate cement clinkers, said preheating temperature is approximately 1600° F. and said heating chamber temperature is between 150 and 500° F. below the melting point of the raw mix.

9. The method of claim 8 in which the raw mix includes in percent by weight: 15.0 to 19.0% $SiO_2$; 1.5 to 6.0% $Al_2O_3$; trace to 4.0% $Fe_2O_3$; 44.0 to 51.0% CaO; 1.0 to 3.0% MgO; 0.1 to 0.8% MnO; trace to 3.0% $SO_3$ as $CaSO_4$; 0.2 to 0.8% alkalies and 22.0 to 28.0% loss on ignition.

10. The method of claim 9 in which the raw mix is pelletized prior to preheating the same.

References Cited

UNITED STATES PATENTS

| | | | |
|---|---|---|---|
| 3,498,594 | 3/1970 | Rikhof | 106—100 |
| 3,451,665 | 6/1969 | Strassen | 106—100 |
| 3,257,219 | 6/1966 | Klein | 106—104 |
| 3,251,701 | 5/1966 | Klein | 106—100 |
| 2,469,989 | 5/1949 | Pyzel | 106—100 |
| 1,366,479 | 1/1921 | Newberry | 106—100 |

TOBIAS E. LEVOW, Primary Examiner

W. T. SCOTT, Assistant Examiner

U.S. Cl. X.R.

106—104; 263—53